United States Patent
Liu et al.

(10) Patent No.: US 11,588,194 B2
(45) Date of Patent: Feb. 21, 2023

(54) BATTERY HEAT ADJUSTMENT CIRCUIT AND METHOD, STORAGE MEDIUM AND ELECTRONIC DEVICE

(71) Applicant: Guangzhou Automobile Group Co., Ltd., Guangdong (CN)

(72) Inventors: Jiarui Liu, Sunnyvale, CA (US); Bozhi Yang, Sunnyvale, CA (US); Xiaohui Li, Sunnyvale, CA (US)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 9 days.

(21) Appl. No.: 17/000,387

(22) Filed: Aug. 24, 2020

(65) Prior Publication Data
US 2022/0059885 A1    Feb. 24, 2022

(51) Int. Cl.
H01M 10/613    (2014.01)
H01M 10/625    (2014.01)
H01M 10/6568   (2014.01)
H01M 10/63     (2014.01)

(52) U.S. Cl.
CPC ..... *H01M 10/6568* (2015.04); *H01M 10/613* (2015.04); *H01M 10/625* (2015.04); *H01M 10/63* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 2003/0087148 A1* | 5/2003 | Minamiura | H01M 10/6563 429/50 |
| 2010/0297483 A1* | 11/2010 | Kawai | H01M 10/6571 429/62 |
| 2012/0295141 A1* | 11/2012 | Allen | H01M 10/615 429/62 |
| 2018/0097265 A1* | 4/2018 | Tarlau | H01M 10/6567 |
| 2019/0089020 A1* | 3/2019 | Ikeno | H01M 10/441 |

FOREIGN PATENT DOCUMENTS

| | | |
|---|---|---|
| CN | 206059590 U | 3/2017 |
| CN | 106608195 A | 5/2017 |
| CN | 108501746 A | 9/2018 |

* cited by examiner

*Primary Examiner* — Lisa S Park
(74) *Attorney, Agent, or Firm* — ScienBiziP, P.C.

(57) ABSTRACT

Provided in embodiments of the disclosure are a battery heat adjustment circuit and method, a storage medium and an electronic device. The circuit includes a battery pack, the battery pack including at least two battery blocks, and each battery block including one or more battery cells; a first controller, respectively connected to partial battery blocks included in the battery pack, and configured to detect a state of partial battery blocks included in the battery pack and control, based on a state detection result, partial battery blocks included in the battery pack to discharge; and a heat adjustment loop, connected to the first controller, and configured to respectively adjust, by using electric energy released by partial battery blocks included in the battery pack, heat of partial battery blocks included in the battery pack. By means of the disclosure, the problems that heating and heat balance of zones in the battery may not be simultaneously solved in the relevant art is solved.

6 Claims, 4 Drawing Sheets

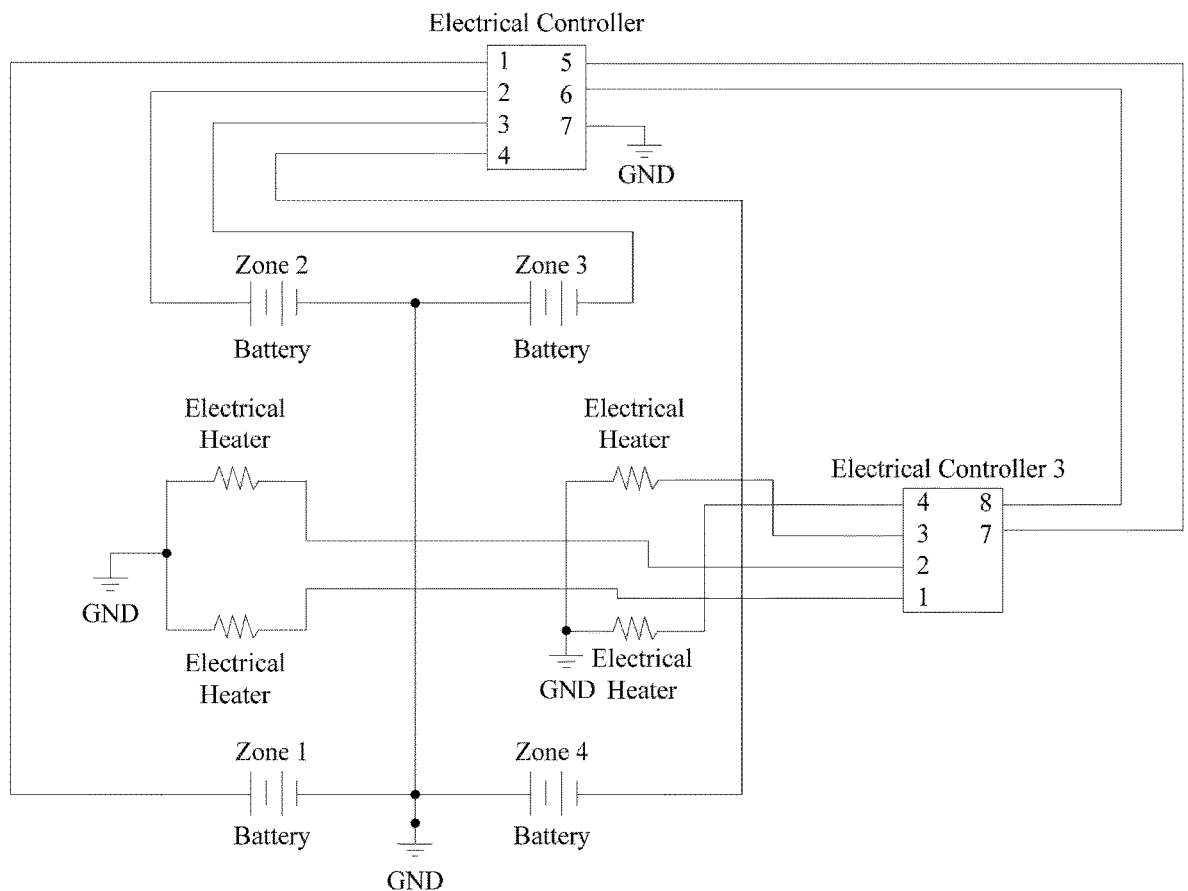

Fig. 4 a state of partial battery blocks included in a battery pack is detected, the battery pack including at least two battery blocks, and each battery block including one or more battery cells — S502 partial battery blocks included in the battery pack is respectively controlled based on a state detection result to discharge — S504 heat of partial battery blocks included in the battery pack is adjusted by using electric energy released by partial battery blocks included in the battery pack — S506

Fig. 5

BATTERY HEAT ADJUSTMENT CIRCUIT AND METHOD, STORAGE MEDIUM AND ELECTRONIC DEVICE

TECHNICAL FIELD

Embodiments of the disclosure relate to the field of communications, and more particularly, to a battery heat adjustment circuit and method, a storage medium and an electronic device.

BACKGROUND

With the focus on energy issues, energy conservation has become a hot topic, and there are increasingly more researches on a battery.

In a relevant art, when the battery is heated, it is general to use the following several solutions. The discharge of a battery module is controlled according to a temperature of the battery module; and discharge energy is used to heat a water channel, thus heating the battery. The discharge of the battery is controlled according to a battery temperature and a surplus electric quantity, heat produced in discharge is used to heat the battery, and discharge energy is stored to an energy storage device. The charge and discharge are performed between a battery pack and a storage battery according to a battery temperature and a surplus electric quantity, and the produced heat is used to heat the battery. As it may be seen, the solutions in the relevant art all aim at the direct discharge and heating of the whole battery, the discharge energy is a value, and problems of heat uniformity and State of Charge, SOC balance in the battery are not considered comprehensively.

Hence, problems of heating and heat balance of zones in the battery may not be solved simultaneously in the relevant art.

Concerning the above-mentioned problems in the relevant art, an effective solution hasn't been pushed forward till now.

SUMMARY

Embodiments of the disclosure provide a battery heat adjustment circuit and method, a storage medium and an electronic device, to at least solve the problems that heating and heat balance of zones in a battery may not be simultaneously solved in a relevant art.

According to one embodiment of the disclosure, a battery heat adjustment circuit is provided, which includes: a battery pack, the battery pack including at least two battery blocks, and each battery block including one or more battery cells; a first controller, respectively connected to partial battery blocks included in the battery pack, and configured to detect a state of partial battery blocks included in the battery pack and control, based on a state detection result, partial battery blocks included in the battery pack to discharge; and a heat adjustment loop, connected to the first controller, and configured to respectively adjust, by using electric energy released by partial battery blocks included in the battery pack, heat of partial battery blocks included in the battery pack.

According to another embodiment of the disclosure, a battery heat adjustment method is provided, which includes that: a state of partial battery blocks included in a battery pack is respectively detected, the battery pack including at least two battery blocks, and each battery block including one or more battery cells; partial battery blocks included in the battery pack is respectively controlled according to a state detection result to discharge; and heat of partial battery blocks included in the battery pack is adjusted by using electric energy released by partial battery blocks included in the battery pack.

According to yet another embodiment of the disclosure, a computer-readable storage medium is also provided. The computer-readable storage medium stores a computer program, and the computer program is configured to perform the steps in any one of the above method embodiments during running.

According to yet another embodiment of the disclosure, an electronic device is also provided, which includes a memory and a processor. The memory stores a computer program. The processor is configured to run the computer program to perform the steps in any one of the above method embodiments.

By means of the disclosure, an inside of a battery is partitioned, an independent electric control loop is respectively provided for partial battery blocks, a state of partial battery blocks is detected, each block is controlled according to a state of partial battery blocks to discharge, and then, heat of the battery block is adjusted according to electric energy released by partial battery blocks, so that an electric energy capacity and a temperature in different zones may be controlled, and the electric energy capacity and the temperature are balanced. Therefore, the disclosure may solve the problems that heating and heat balance of zones in the battery may not be simultaneously solved in the relevant art, may simultaneously balance the temperature and the electric energy capacity of the battery in one or more battery packs, greatly improves the performance and health condition of the battery, reduces a battery fault, prolongs a service life of the battery, and improves the performance of the battery pack.

BRIEF DESCRIPTION OF THE DRAWINGS

FIG. 4 is a third structural schematic diagram of a heat adjustment loop according to an exemplary embodiment of the disclosure.

FIG. 5 is a structural block diagram of hardware of a mobile terminal of a battery heat adjustment method according to an embodiment of the disclosure.

DETAILED DESCRIPTION OF THE EMBODIMENTS

The disclosure is described below with reference to the drawings and in conjunction with the embodiments in detail.

It should be noted that, terms such as "first" and "second" in the specification, claims and accompanying drawings of the disclosure are only used to distinguish similar objects, rather than to describe a special order or a precedence order.

Figure 1:
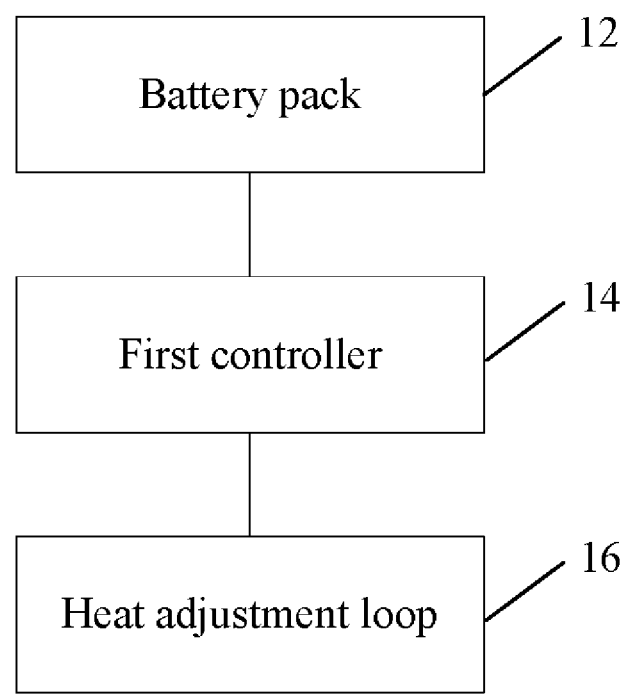
FIG. 1 is a structural block diagram of a battery heat adjustment circuit according to an embodiment of the disclosure.

The embodiment provides a battery heat adjustment circuit. FIG. 1 is a structural block diagram of a battery heat adjustment circuit according to an embodiment of the disclosure. As shown in FIG. 1, the device includes: a battery pack 12, a first controller 14 and a heat adjustment loop 16.

The battery pack 12 includes at least two battery blocks, and each battery block includes one or more battery cells.

The first controller 14 is respectively connected to partial battery blocks included in the battery pack, and configured to respectively detect a state of partial battery blocks included in the battery pack and respectively control, based on a state detection result, partial battery blocks included in the battery pack to discharge.

The heat adjustment loop 16 is connected to the first controller, and configured to respectively adjust, by using electric energy released by partial battery blocks included in the battery pack, heat of partial battery blocks included in the battery pack.

In the above embodiment, each battery block may be a group of batteries in the battery pack. Each battery block may include one or more cells, and one or more modules. Each battery block may have different shapes, such as a rectangular shape, an annular shape, a circular shape or other shapes. Respectively detecting the state of partial battery blocks included in the battery pack may be to detect a voltage, an SOC, a capacity, a temperature and the like of partial battery blocks. According to the SOC of partial battery blocks and with discharge control on partial battery blocks, the energy output of the discharge of partial battery blocks may be different values because the problem of SOC balance is considered comprehensively.

By means of the disclosure, an inside of a battery is partitioned, an independent electric control loop is respectively provided for partial battery blocks, a state of partial battery blocks is detected, each block is controlled according to a state of partial battery blocks to discharge, and then, heat of the battery block is adjusted according to electric energy released by partial battery blocks, so that an electric energy capacity and a temperature in different zones may be controlled, and the electric energy capacity and the temperature are balanced. Therefore, the disclosure may solve the problems that heating and heat balance of zones in the battery may not be simultaneously solved in the relevant art, may simultaneously balance the temperature and the electric energy capacity of the battery in one or more battery packs, greatly improves the performance and health condition of the battery, reduces a battery fault, prolongs a service life of the battery, and improves the performance of the battery pack.

Figure 2:
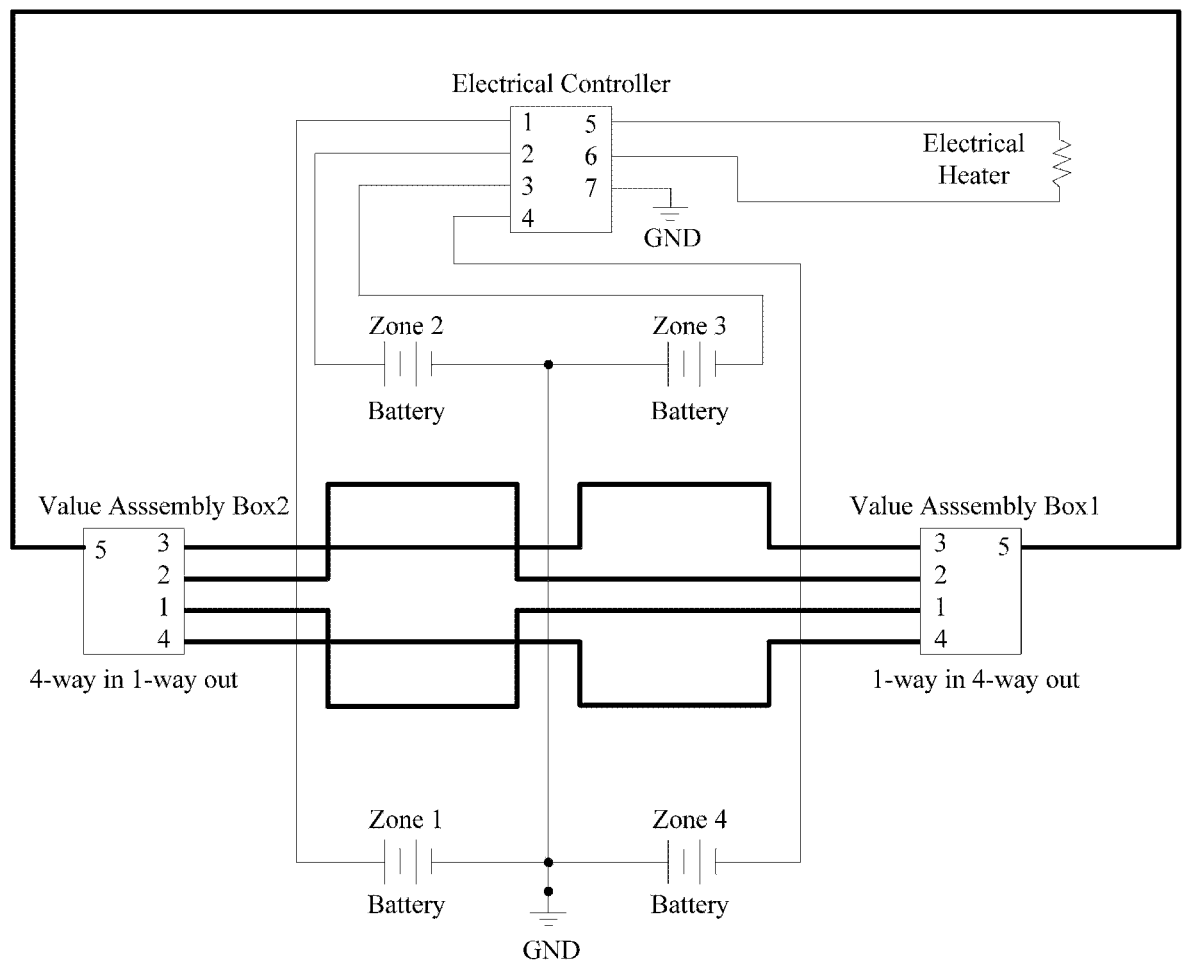
FIG. 2 is a first structural schematic diagram of a heat adjustment loop according to an exemplary embodiment of the disclosure.

In an exemplary embodiment, the heat adjustment loop includes: a heat adjuster, connected to the first controller, and configured to adjust a temperature of a cooling liquid by using the electric energy released by partial battery blocks included in the battery pack; and a valve assembly box, configured to distribute the cooling liquid flowing through partial battery blocks included in the battery pack, and respectively control a flow velocity of the cooling liquid flowing through partial battery blocks included in the battery pack. In the embodiment, a first structural schematic diagram of the heat adjustment loop may be referred to FIG. 2. As shown in FIG. 2, the battery pack is divided into multiple zones, that is, multiple battery blocks; and each zone may include one or more battery cells (or called as battery modules). For each zone, the battery state (for example, the voltage, the SOC, the capacity and the temperature) may be measured or detected respectively. The first controller (such as an electrical controller) is configured to detect the SOC of each battery zone and respectively control each zone to discharge. The heat adjuster, that is, a heater (such as a Positive Temperature Coefficient, PTC, electrical heater), is connected to the electrical controller to heat the cooling liquid. The valve assembly box (that is, a group of valves) may be configured to distribute the cooling liquid to different battery zones. Moreover, it may independently control the flow velocity of the cooling liquid in the different battery zones so as to heat each independent battery zone at a required heating rate. The working mechanism is as follows: when there is a need to control or balance the SOC, each battery zone discharges at an independent controlled discharge rate. The energy produced during a discharge process is used to heat the cooling liquid via the electrical heater. The valve assembly box is configured to distribute the cooling liquid to different zones. Moreover, it may independently control the flow velocity of the coolant in the different battery zones so as to heat each independent battery zone at an independent heating rate. With such a method, the electric energy in a battery zone having a high SOC is converted into heat energy in a low temperature zone. Therefore, overall electric energy balance and temperature uniformity may be implemented. A heavy line in FIG. 2 denotes a cooling liquid loop of the battery.

Figure 3:
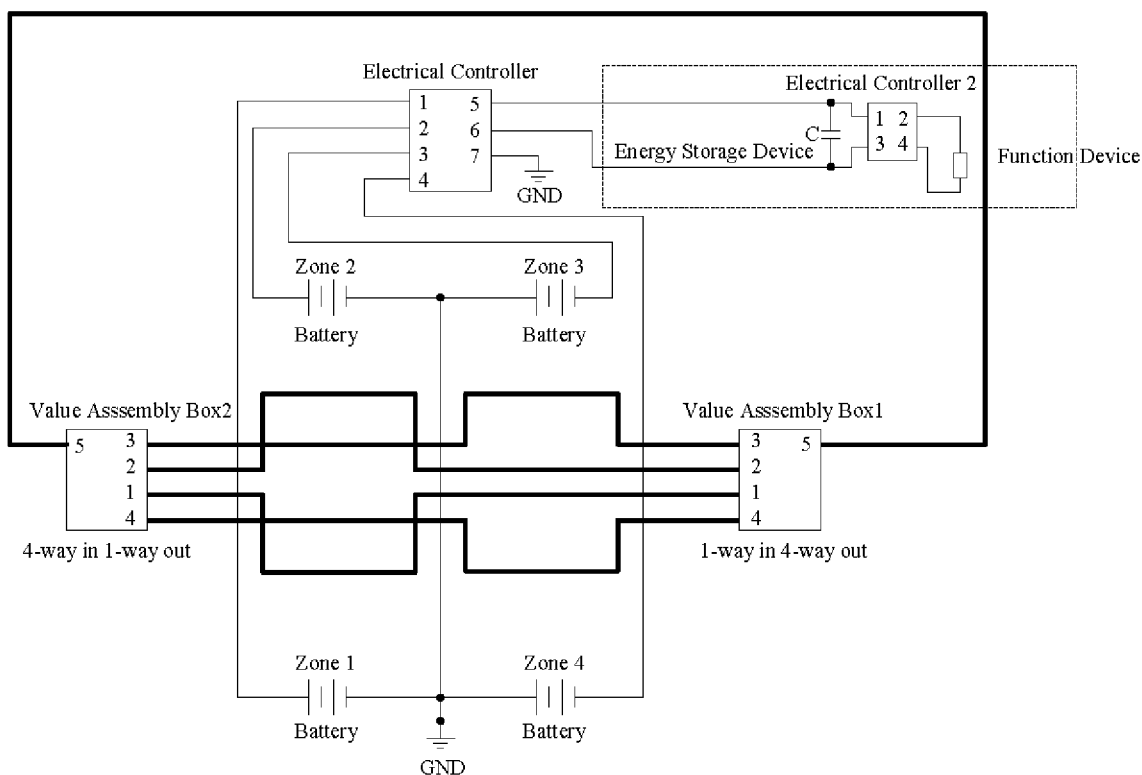
FIG. 3 is a second structural schematic diagram of a heat adjustment loop according to an exemplary embodiment of the disclosure.

In an exemplary embodiment, the heat adjustment loop includes: an energy storage circuit, connected to the first controller, and configured to store the electric energy released by partial battery blocks included in the battery pack and adjust a temperature of a cooling liquid by using the stored electric energy; and a valve assembly box, configured to distribute the cooling liquid flowing through partial battery blocks included in the battery pack, and respectively control a flow velocity of the cooling liquid flowing through partial battery blocks included in the battery pack. In the embodiment, a second structural schematic diagram of the heat adjustment loop may be referred to FIG. 3. As shown in FIG. 3, the heat adjustment loop includes the energy storage circuit, the first controller and the valve assembly box. The energy storage circuit is connected to the first controller, and configured to store energy temporarily and adjust the temperature of the cooling liquid by using the stored electric energy. It is to be noted that the energy storage circuit shown in FIG. 3 is merely illustrative. The energy storage circuit may further be a circuit composed of other components.

In an exemplary embodiment, the energy storage circuit includes: an energy storage device, connected to the first controller, and configured to store the electric energy released by partial battery blocks included in the battery pack; a second controller, connected to the energy storage device, and configured to control the stored electric energy in the energy storage device to release to a function device; and the function device, connected to the second controller, and configured to adjust the temperature of the cooling liquid under the driving of the electric energy released by the second controller. In the embodiment, the energy storage circuit may include the energy storage device, the second controller and the function device. The energy storage device is connected to an electrical controller, and configured to store electric energy released in an SOC balance process. The second controller is connected to the energy storage device and the function device, and configured to control an energy flow between the two devices. The function device is driven by the electric energy in the energy storage device.

In the embodiment, the heat adjustment loop shown in FIG. 3 has the following working mechanism: the electric energy produced in the SOC balance is stored in the energy storage device, the energy in the energy storage device is configured to heat or cool the cooling liquid, and the cooling liquid may also heat or cool each independent battery zone. When the nonuniformity of the SOC reaches a certain threshold, each independent battery zone discharges at an dependent controlled discharge rate with the help of the first controller. When a temperature variation of the battery reaches a certain threshold, the electric energy stored in the energy device is released to the function device to cool or heat the cooling liquid. The valve assembly box is configured to distribute the cooling liquid to different zones. Moreover, it may independently control the flow velocity of the cooling liquid in the different battery zones so as to heat at an independent heating rate or cool each battery zone. By means of such a mechanism, the electric energy and the temperature may be balanced (or controlled) at different periods of time or at the same time.

In the foregoing embodiment, the electric energy and the temperature are balanced by discharging some battery zone and using a fluid loop and the electrical heater to selectively heat other zones.

In an exemplary embodiment, the energy storage device includes at least one of the following devices: a capacitor, a battery, and an inductor. In the embodiment, the energy storage device may be a device capable of storing the electric energy, such as the capacitor, the battery and the inductor.

In an exemplary embodiment, the function device includes at least one of the following devices: a heat pump, an electrical heater, a coolant compressor, and a cooling fan. In the embodiment, the function device may be a device capable of adjusting the temperature of the cooling liquid. The device for heating the cooling liquid may be the heat pump, the electrical heater, etc.; and the device for cooling the cooling liquid may be the coolant compressor, the cooling fan, etc.

In an exemplary embodiment, the heat adjustment loop includes: at least two electrical heaters, disposed correspondingly to the battery blocks, and configured to respectively adjust the heat of the battery blocks; and a third controller, connected to the first controller and respectively connected to each electrical heater of the at least two electrical heaters, and configured to distribute the electric energy released by partial battery blocks included in the battery pack to each electrical heater of the at least two electrical heaters. In the embodiment, a third structural schematic diagram of the heat adjustment loop may be referred to FIG. 4. As shown in FIG. 4, the loop may use an in-situ heater to heat an expected battery zone, that is, a fluid loop is removed, and several independent electrical heaters and the third controller are used to replace the electrical heater in each battery zone. The third electrical controller distributes an electric energy flow to each electrical heater so as to provide different heating rates for each zone. The loop has the following working mechanism: the energy produced in a discharge process is distributed by the third controller, and sent to each electrical heater, so that each battery zone is heated at an independent heating rate. With such a mechanism, the electric energy in the battery zone having the high SOC is converted into the heat energy in the low temperature zone. Therefore, the overall electric energy balance and the temperature uniformity are implemented.

In the foregoing embodiment, a temperature curve and a capacity (or an SOC charging state) of the battery in the battery pack are controlled simultaneously by selectively heating a battery cell at a low temperature with a battery cell at high energy, thus implementing the temperature uniformity and the electric energy balance of the battery pack (in a heat aspect, an objective of the heat balance is to enable temperatures in different batteries, modules or zones of the battery pack to be same; and in an electrical aspect, an objective of the electrical balance is to enable the capacity, SOC or other battery parameters of each battery, module or zone in the battery pack to be the same). The heat adjustment loop may work independently, and may further be integrated to other temperature control systems to provide more possibilities for structural arrangement of the system. The adjustment loop may simultaneously perform heat and electrical balances, and may be configured to simultaneously control the battery pack to obtain required heat and electric characteristics. As a result, the temperature uniformity is unnecessary to some extent. In addition, the temperature control is not limited to the heat uniformity between batteries, which is merely a particular case of the temperature control. In some cases, the temperature between the battery cells or zones may need to be nonuniform for the battery pack. Similarly, the heat adjustment loop may be expanded to implement various required capacity configuration documents but not merely limited to obtain a same capacity or the SOC between the batteries. In some cases, the battery pack may need nonuniform capacity or SOC between the batteries. The heat adjustment loop is applied to any battery pack that needs the heat uniformity and the energy balance, for example, an Electric Vehicle, EV, a Hybrid Electric Vehicle, HEV, a Fuel cell Vehicle, FCV, a ship, an airplane or a battery pack using new, old or recycled battery cells and used in fixed electric energy storage. By simultaneously controlling the temperature curve and the capacity (or the SOC charging state) of the battery in the battery pack, the heat uniformity and the electric energy balance in the battery are implemented, and the performance and service life required by a vehicle-mounted battery pack of a new energy vehicle (the EV, the HEV or the FCV) are improved.

The embodiments of the disclosure further provide a battery heat adjustment method. FIG. 5 is a flowchart of a battery heat adjustment method according to an embodiment of the disclosure. As shown in FIG. 5, the flow includes the following steps.

In step S502, a state of partial battery blocks included in a battery pack is detected, the battery pack including at least two battery blocks, and each battery block including one or more battery cells.

In step S504, partial battery blocks included in the battery pack is respectively controlled based on a state detection result to discharge.

In step S506, heat of partial battery blocks included in the battery pack is adjusted by using electric energy released by partial battery blocks included in the battery pack.

The method may be applied to the foregoing battery heat adjustment circuit.

By means of the disclosure, an inside of a battery is partitioned, an independent electric control loop is respectively provided for partial battery blocks, a state of partial battery blocks is detected, each block is controlled according to a state of partial battery blocks to discharge, and then, heat of the battery block is adjusted according to electric energy released by partial battery blocks, so that an electric energy capacity and a temperature in different zones may be controlled, and the electric energy capacity and the temperature are balanced. Therefore, the disclosure may solve the problems that heating and heat balance of zones in the battery may not be simultaneously solved in the relevant art, may simultaneously balance the temperature and the electric energy capacity of the battery in one or more battery packs, greatly improves the performance and health condition of the battery, reduces a battery fault, prolongs a service life of the battery, and improves the performance of the battery pack.

In an exemplary embodiment, the operation that a state of partial battery blocks included in a battery pack is detected includes that: an SOC of partial battery blocks included in the battery pack is respectively detected; and the operation that partial battery blocks included in the battery pack is respectively controlled based on a state detection result to discharge includes that: partial battery blocks included in the battery pack is respectively controlled based on an SOC detection result.

In an exemplary embodiment, the operation that heat of partial battery blocks included in the battery pack is adjusted by using electric energy released by partial battery blocks included in the battery pack includes that: a temperature of a cooling liquid is adjusted by using the electric energy released by partial battery blocks included in the battery pack; and based on a temperature of partial battery blocks included in the battery pack, the cooling liquid flowing through partial battery blocks included in the battery pack is distributed, a flow velocity of the cooling liquid flowing through partial battery blocks included in the battery pack is respectively controlled, and the heat of partial battery blocks included in the battery pack is adjusted.

In an exemplary embodiment, the operation that heat of partial battery blocks included in the battery pack is adjusted by using electric energy released by partial battery blocks included in the battery pack includes that: the electric energy released by partial battery blocks included in the battery pack is stored, and a temperature of a cooling liquid is adjusted by using the stored electric energy; and based on a temperature of partial battery blocks included in the battery pack, the cooling liquid flowing through partial battery blocks included in the battery pack is distributed, a flow velocity of the cooling liquid flowing through partial battery blocks included in the battery pack is respectively controlled, and the heat of partial battery blocks included in the battery pack is adjusted.

In an exemplary embodiment, the operation that heat of partial battery blocks included in the battery pack is adjusted by using electric energy released by partial battery blocks included in the battery pack includes that: the electric energy released by partial battery blocks included in the battery pack is distributed to each electrical heater of at least two electrical heaters, so as to adjust the heat of partial battery blocks included in the battery pack, the electrical heaters being disposed corresponding to the battery blocks.

By means of the above-mentioned descriptions on the implementation manner, the person skilled in the art may clearly understand that the present invention may be implemented by software plus a necessary universal hardware platform, and may also be implemented by hardware, but under most conditions, the former is a better implementation manner. Based on such an understanding, the technical solutions of the present invention essentially, or the part contributing to the conventional art may be implemented in a form of a software product. The computer software product is stored in a storage medium (such as a Read Only Memory, ROM/Random Access Memory, RAM, a magnetic disk, and an optical disc) and includes a plurality of instructions for instructing a terminal device (which may be a mobile phone, a computer, a server, or a network device, etc.) to execute the methods described in the embodiments of the present invention.

The embodiments of the disclosure also provide a computer-readable storage medium. The computer-readable storage medium stores a computer program, and the computer program is configured to perform the steps in any one of the above method embodiments during running.

In an exemplary embodiment, the computer-readable storage medium may include but not limited to: various media capable of storing a computer program such as a U disk, an ROM, an RAM, a mobile hard disk, a magnetic disk or an optical disc.

The embodiments of the disclosure also provide an electronic device, which includes a memory and a processor. The memory stores a computer program. The processor is configured to run the computer program to perform the steps in any one of the above method embodiments.

In an exemplary embodiment, the electronic device may further include a transmission device and an input/output device, and the transmission device is connected to the processor, and the input/output device is connected to the processor.

A specific example in the present embodiment may refer to the examples described in the above embodiments and optional implementation manners, and details are not described herein in the present embodiment.

It is apparent that those skilled in the art should understand that the above-mentioned steps of the disclosure may be implemented by a general-purpose computing device, and they may be centralized on a single computing device or distributed on a network composed of multiple computing devices. Optionally, they may be implemented with program codes executable by a computing device, so that they may be stored in a storage device and executed by the computing device, and in some cases, the steps shown or described may be performed in a different order than here, or they are separately made into individual integrated circuit modules, or multiple steps therein are made into a single integrated circuit module for implementation. As such, the disclosure is not limited to any particular combination of hardware and software.

The above is only the preferred embodiments of the disclosure, not intended to limit the disclosure. As will occur to those skilled in the art, the disclosure is susceptible to various modifications and changes. Any modifications, equivalent replacements, improvements and the like made within the principle of the disclosure shall fall within the scope of protection of the disclosure.

What is claimed is:

1. A battery heat adjustment circuit, comprising:
    a battery pack, wherein the battery pack comprises at least two battery blocks, and each battery block comprises one or more battery cells;
    a first controller, respectively connected to at least two battery blocks comprised in the battery pack, and configured to respectively detect a state of at least two battery blocks comprised in the battery pack and respectively control, based on a state detection result, at least two battery blocks comprised in the battery pack to discharge; and
    a heat adjustment loop, connected to the first controller, and configured to respectively adjust, by using electric energy released by at least two battery blocks comprised in the battery pack, heat of at least two battery blocks comprised in the battery pack;
    wherein the heat adjustment loop comprises a heat adjuster and a valve assembly box, the heat adjuster is connected to the first controller, and is configured to adjust a temperature of a cooling liquid by using the electric energy released by at least two battery blocks comprised in the battery pack; the valve assembly box is configured to distribute the cooling liquid flowing through at least two battery blocks comprised in the battery pack, and respectively control a flow velocity of the cooling liquid flowing through at least two battery blocks comprised in the battery pack;

wherein the heat adjustment loop further comprises an energy storage circuit, the energy storage circuit is connected to the first controller, and is configured to store the electric energy released by at least two battery blocks comprised in the battery pack and adjust a temperature of a cooling liquid by using the stored electric energy;

wherein the energy storage circuit comprises an energy storage device, a second controller, a function device, the energy storage device is connected to the first controller, and is configured to store the electric energy released by at least two battery blocks comprised in the battery pack; the second controller is connected to the energy storage device, and is configured to control the stored electric energy in the energy storage device to release to a function device; and the function device is connected to the second controller, and is configured to adjust the temperature of the cooling liquid under the driving of the electric energy released by the second controller.

2. The circuit according to claim 1, wherein the energy storage device comprises at least one of the following devices:

a capacitor, a battery, and an inductor.

3. The circuit according to claim 1, wherein the function device comprises at least one of the following devices:

a heat pump, an electrical heater, a coolant compressor, and a cooling fan.

4. A battery heat adjustment method, comprising:

detecting a state of at least two battery blocks comprised in a battery pack, wherein the battery pack comprises at least two battery blocks, and each battery block comprises one or more battery cells;

respectively controlling, based on a state detection result, at least two battery blocks comprised in the battery pack to discharge; and adjusting, by using electric energy released by at least two battery blocks comprised in the battery pack, heat of at least two battery blocks comprised in the battery pack;

wherein adjusting, by using electric energy released by at least two battery blocks comprised in the battery pack, heat of at least two battery blocks comprised in the battery pack comprises: adjusting a temperature of a cooling liquid by using the electric energy released by at least two battery blocks comprised in the battery pack; and distributing, based on a temperature of at least two battery blocks comprised in the battery pack, the cooling liquid flowing through at least two battery blocks comprised in the battery pack, and respectively controlling a flow velocity of the cooling liquid flowing through at least two battery blocks comprised in the battery pack, so as to adjust the heat of at least two battery blocks comprised in the battery pack;

wherein adjusting, by using electric energy released by at least two battery blocks comprised in the battery pack, heat of at least two battery blocks comprised in the battery pack comprises:

storing the electric energy released by at least two battery blocks comprised in the battery pack and adjusting a temperature of a cooling liquid by using the stored electric energy; and distributing, based on a temperature of at least two battery blocks comprised in the battery pack, the cooling liquid flowing through at least two battery blocks comprised in the battery pack, and respectively controlling a flow velocity of the cooling liquid flowing through at least two battery blocks comprised in the battery pack, so as to adjust the heat of at least two battery blocks comprised in the battery pack.

5. A computer-readable storage medium, storing a computer program, wherein the computer program is configured to perform the method according to claim 4 during running.

6. An electronic device, comprising a memory and a processor, wherein the memory stores a computer program, and the processor is configured to run the computer program to perform the method according to claim 4.

* * * * *